(12) United States Patent
Wu et al.

(10) Patent No.: US 8,315,044 B2
(45) Date of Patent: Nov. 20, 2012

(54) SLIDE AND TILT MECHANISM FOR ELECTRONIC DEVICE

(75) Inventors: Kun-Tsan Wu, Shindian (TW); Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 206 days.

(21) Appl. No.: 12/825,480

(22) Filed: Jun. 29, 2010

(65) Prior Publication Data

US 2011/0156562 A1    Jun. 30, 2011

(30) Foreign Application Priority Data

Dec. 31, 2009 (CN) .......................... 2009 1 0312843

(51) Int. Cl.
*H05K 7/16* (2006.01)
(52) U.S. Cl. ......... 361/679.02; 361/679.55; 361/679.21; 455/575.4; 455/575.3; 312/323
(58) Field of Classification Search ............. 361/679.01, 361/679.02, 679.55–58, 724–727, 679.21, 361/679.26, 679.27, 679.3, 679.09; 455/575.1–575.4; 312/323
See application file for complete search history.

(56) References Cited

U.S. PATENT DOCUMENTS

| | | | | |
|---|---|---|---|---|
| 6,882,524 B2 * | 4/2005 | Ulla et al. | ................. | 361/679.09 |
| 7,278,184 B2 * | 10/2007 | Kuramochi | ..................... | 16/357 |
| 2008/0161075 A1 * | 7/2008 | Kim et al. | .................. | 455/575.4 |
| 2009/0011802 A1 * | 1/2009 | Malthe et al. | .............. | 455/575.1 |
| 2010/0041450 A1 * | 2/2010 | Wang et al. | ................. | 455/575.4 |
| 2011/0038105 A1 * | 2/2011 | Liu et al. | .................. | 361/679.01 |

* cited by examiner

Primary Examiner — Jinhee Lee
Assistant Examiner — Ingrid Wright
(74) Attorney, Agent, or Firm — Altis Law Group, Inc.

(57) ABSTRACT

An electronic device includes a first housing, a second housing covering the first housing, a tilt mechanism, a first hinge bar, and a second hinge bar. The tilt mechanism connects the first housing to the second housing. A first end of the first hinge bar rotatably connects to the tilt mechanism, a second end of the first hinge bar rotatably and slidably connects to the first housing. A first end of the second hinge bar rotatably connects to the tilt mechanism, a second end of the second hinge bar rotatably connects to the first housing. When the second housing slides relative to the first housing, the second hinge bar rotates relative to the first housing and the second housing, and supports and tilts the second housing.

16 Claims, 8 Drawing Sheets

SLIDE AND TILT MECHANISM FOR ELECTRONIC DEVICE

BACKGROUND

1. Technical Field

The present disclosure generally relates to electronic devices, and particularly to a slide and tilt mechanism for an electronic device.

2. Description of Related Art

Portable electronic devices such as mobile phones, laptops, and personal digital assistants (PDAs) are widely used. Slide-type portable electronic devices have been increasingly used. A slide-type portable electronic device has two housings, of which one slides relative to the other by a slide mechanism to open/close the portable electronic device.

However, the slide-type portable electronic devices typically only allow the two housings to slide parallel to each other. Therefore, when the slide-type portable electronic device is positioned horizontally, it can be difficult for users to view a display screen disposed on the housing.

Therefore, there is a room for improvement within the art.

BRIEF DESCRIPTION OF THE DRAWINGS

Many aspects of the slide and tilt mechanism for electronic device can be better understood with reference to the following drawings. The components in the drawings are not necessarily to scale, the emphasis instead being placed upon clearly illustrating the slide and tilt mechanism for electronic device. Moreover, in the drawings, like reference numerals designate corresponding parts throughout the several views.

DETAILED DESCRIPTION

Figure 1:
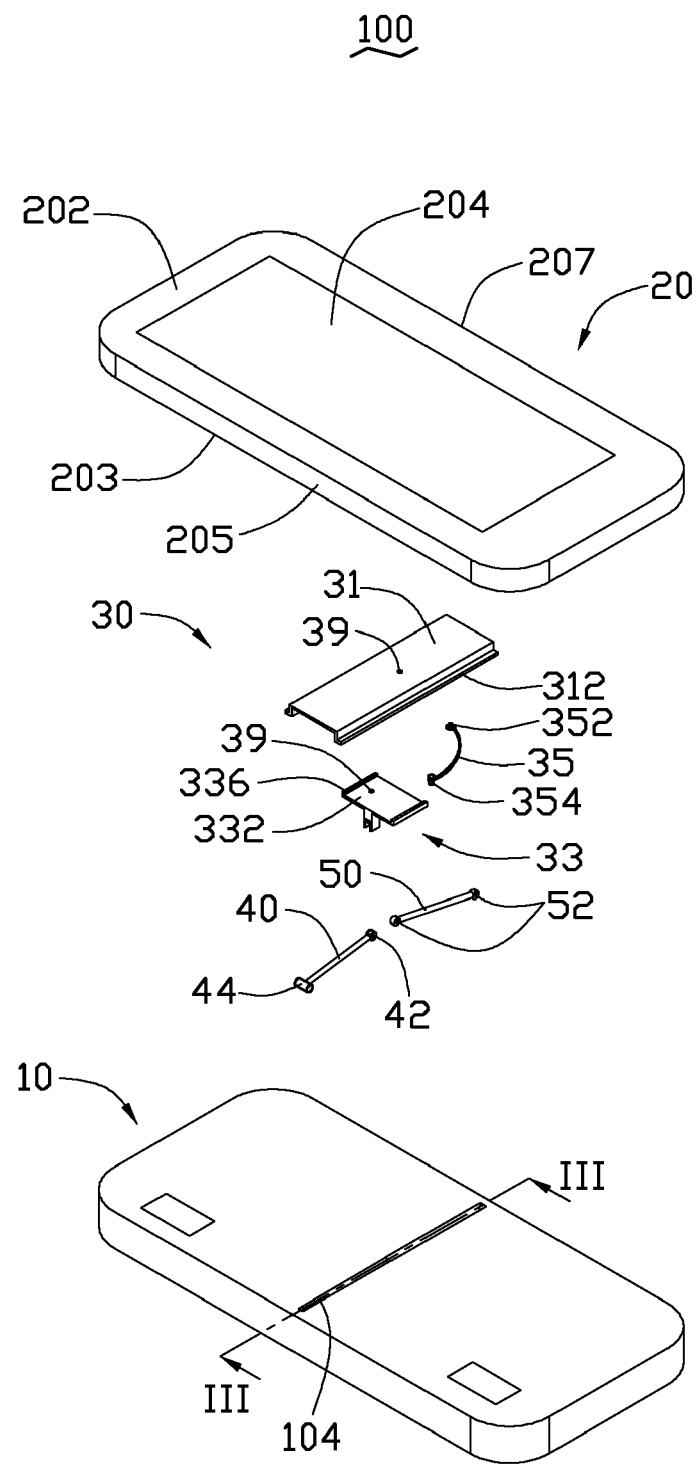
FIG. 1 is an exploded, isometric view of an electronic device according to an exemplary embodiment.
Figure 2:
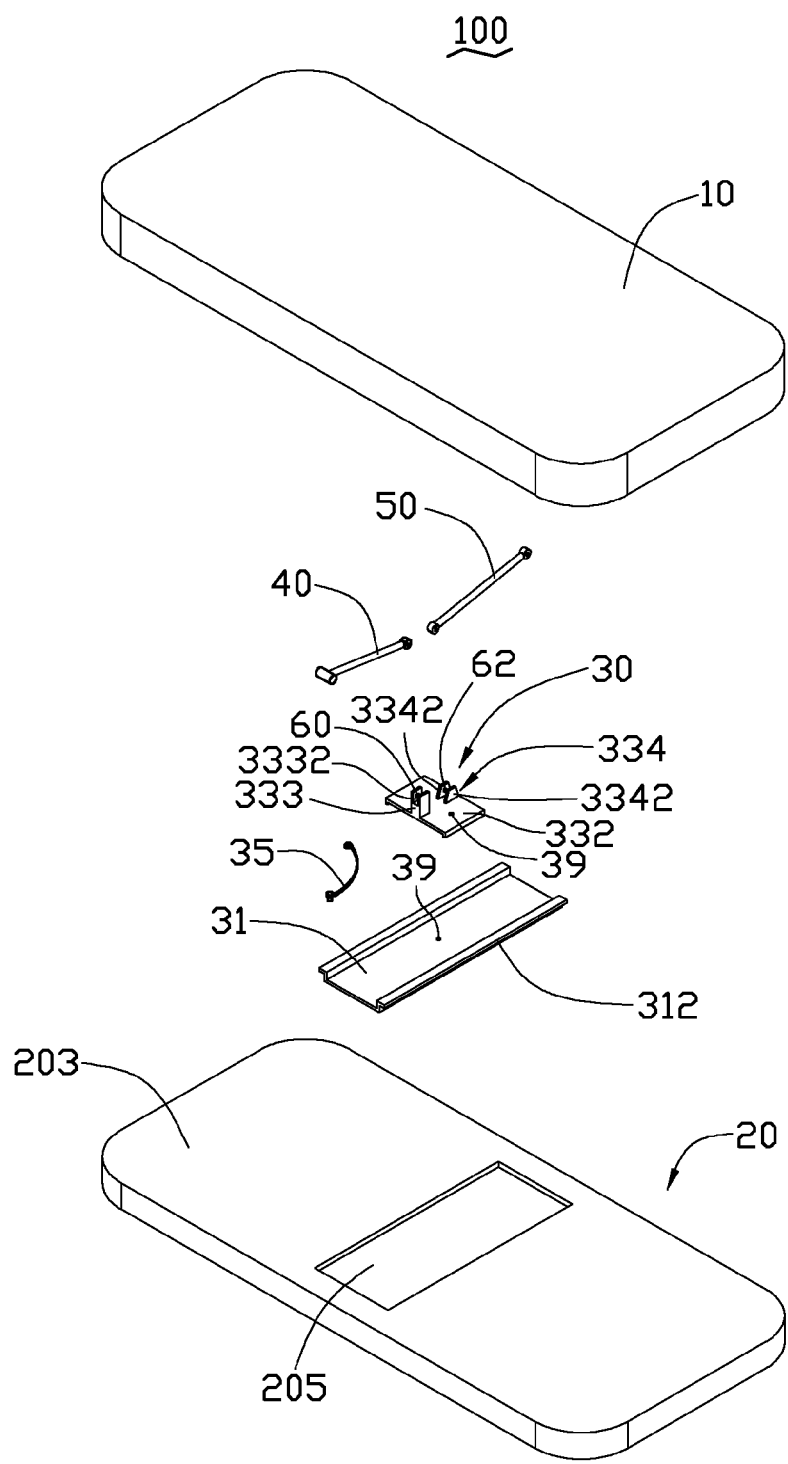
FIG. 2 is similar to FIG. 1, but shown from another angle.

FIG. 1 and FIG. 2 show an exemplary embodiment of an electronic device 100, such as a mobile phone, or a personal digital assistant. The electronic device 100 includes a first housing 10, a second housing 20, a tilt mechanism 30, a first hinge bar 40, and a second hinge bar 50. In a closed state, the first housing 10 and the second housing 20 overlap each other. In a tilted state, the second housing 20 may be angularly adjusted relative to the first housing 10 for better viewing of a display screen.

Figure 3:
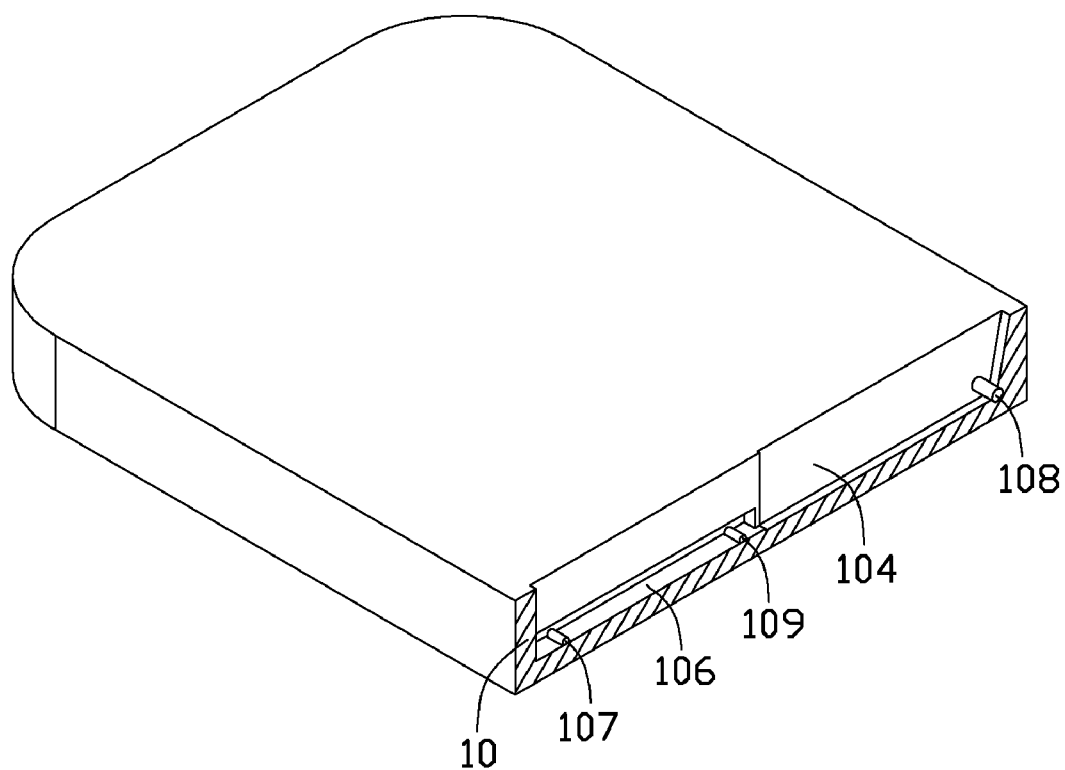
FIG. 3 is a cross-sectional view of the housing taken along line III-III of FIG. 1.
Figure 4:
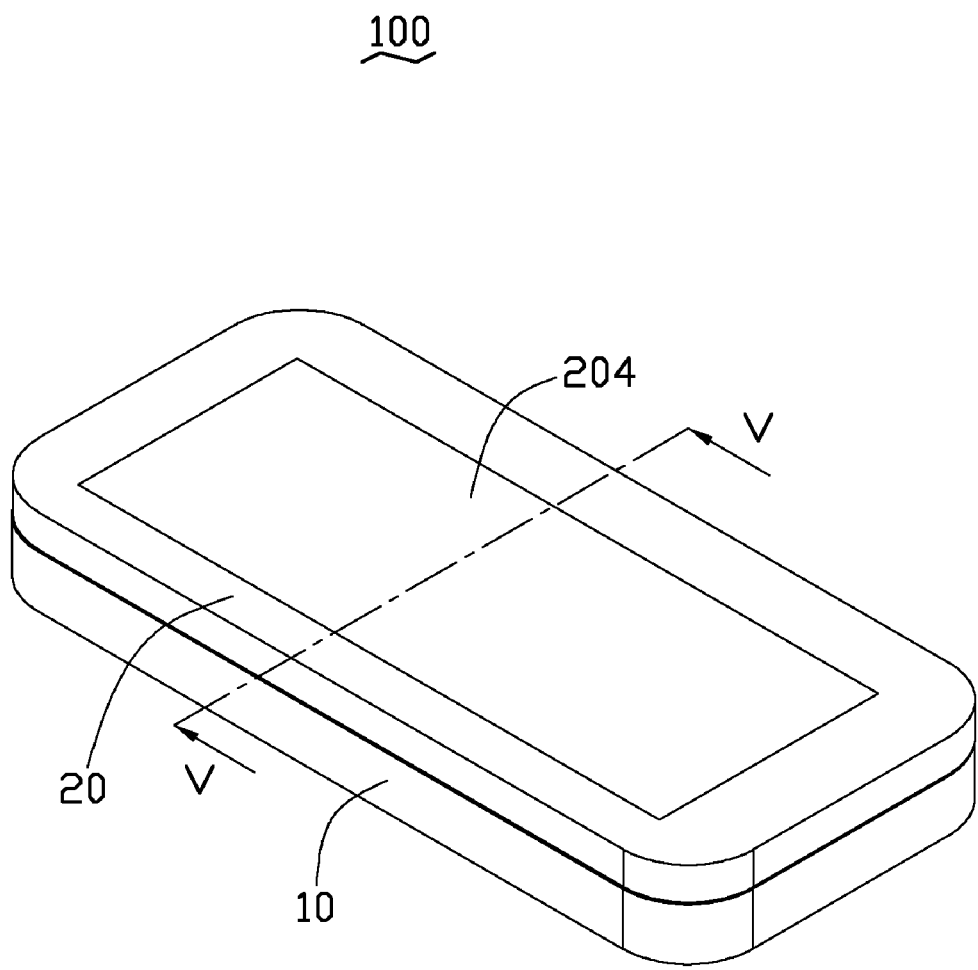
FIG. 4 is an assembled view of the electronic device of FIG. 1 in a closed state.
Figure 5:
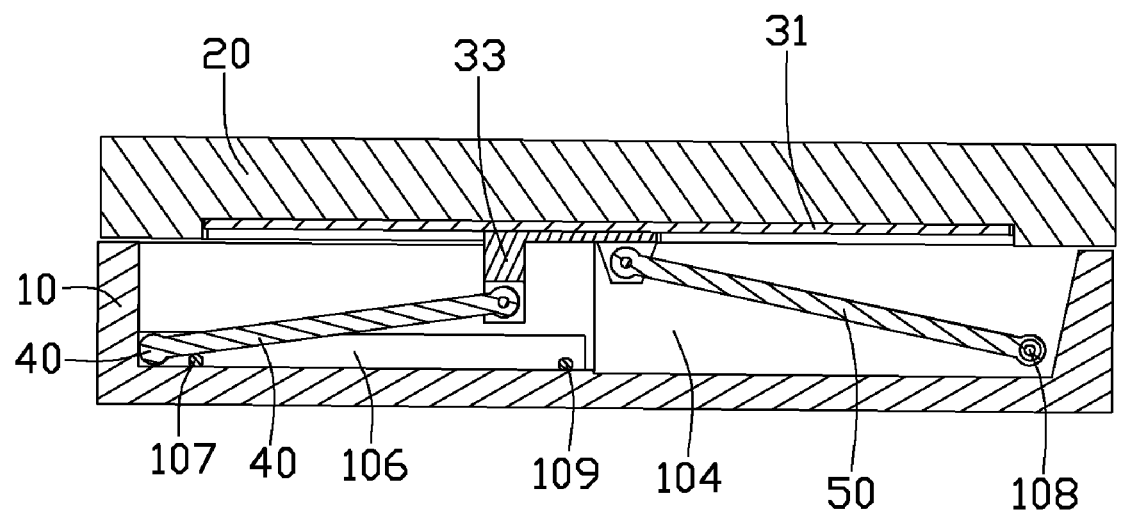
FIG. 5 is a cross-sectional view of the housing taken along line V-V of FIG. 4.
Figure 6:
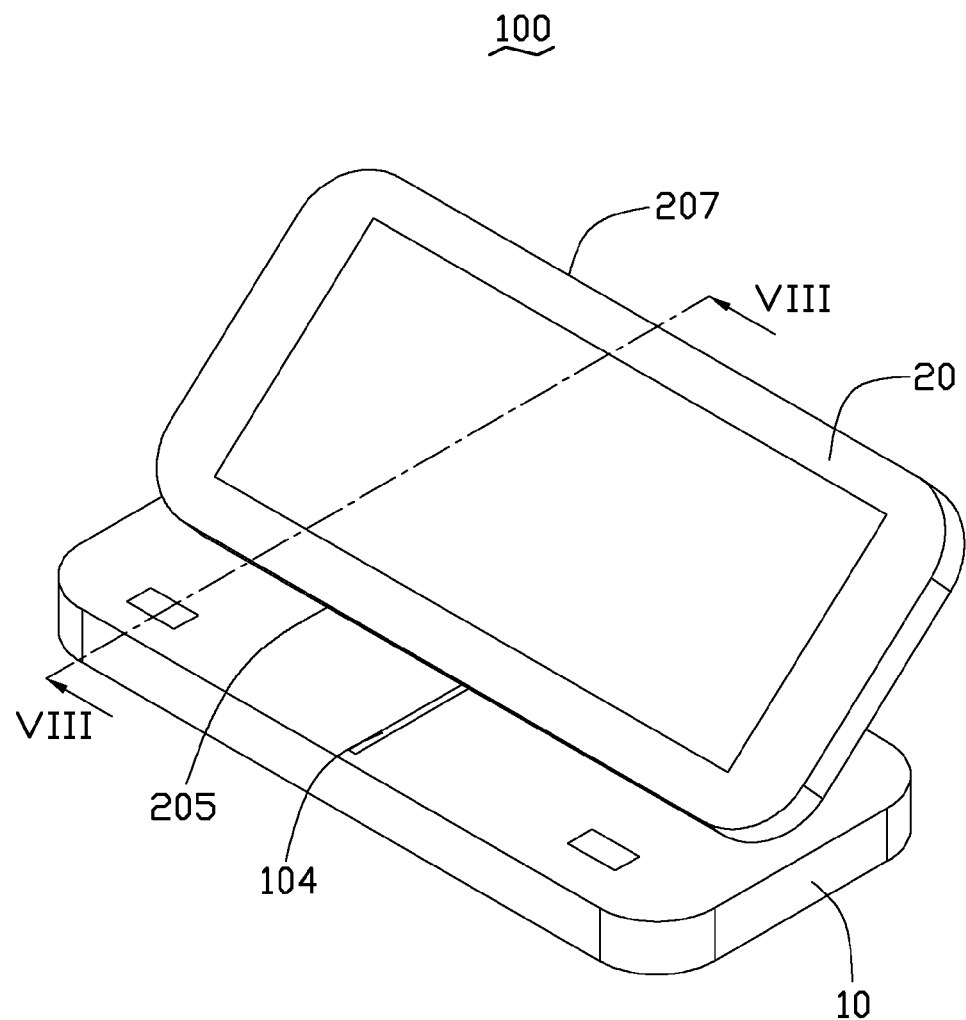
FIG. 6 is an isometric view of the electronic device of FIG. 3 in an open state.
Figure 7:
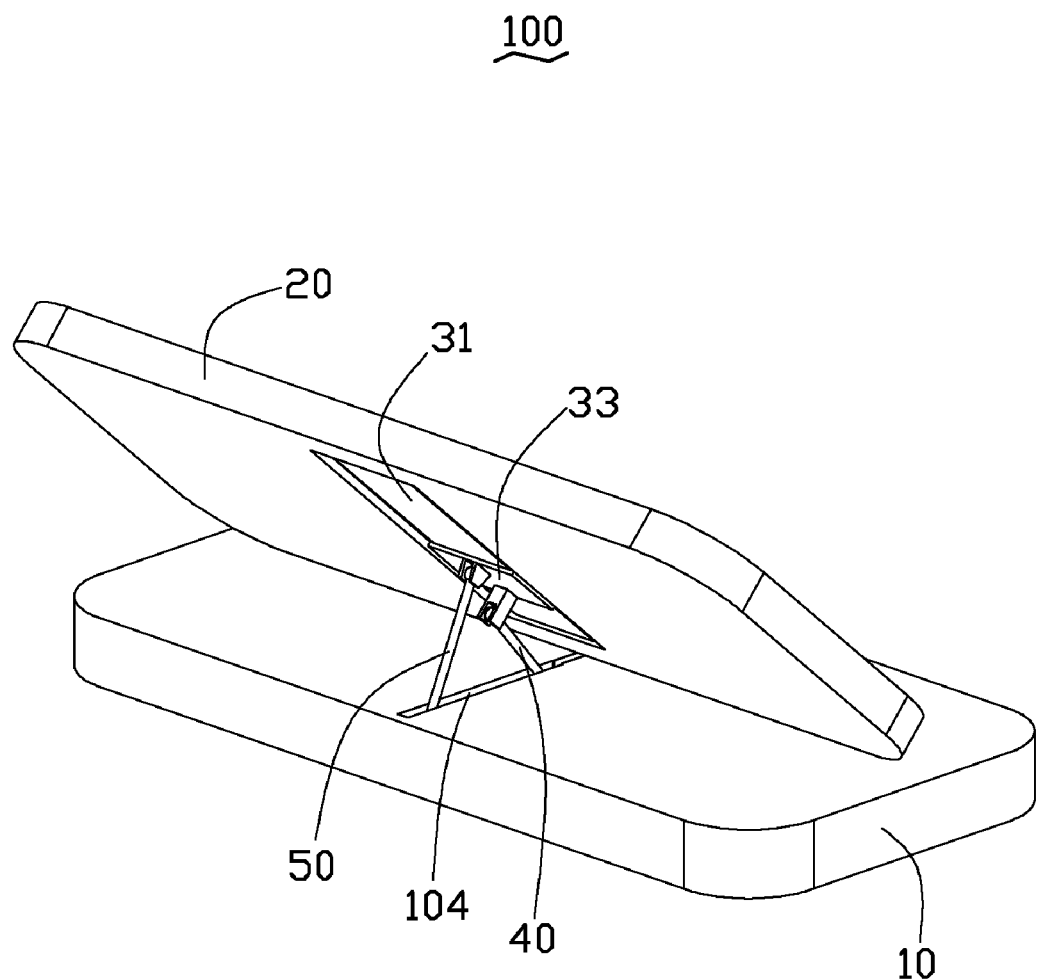
FIG. 7 is similar to FIG. 5, but shown from another angle.
Figure 8:
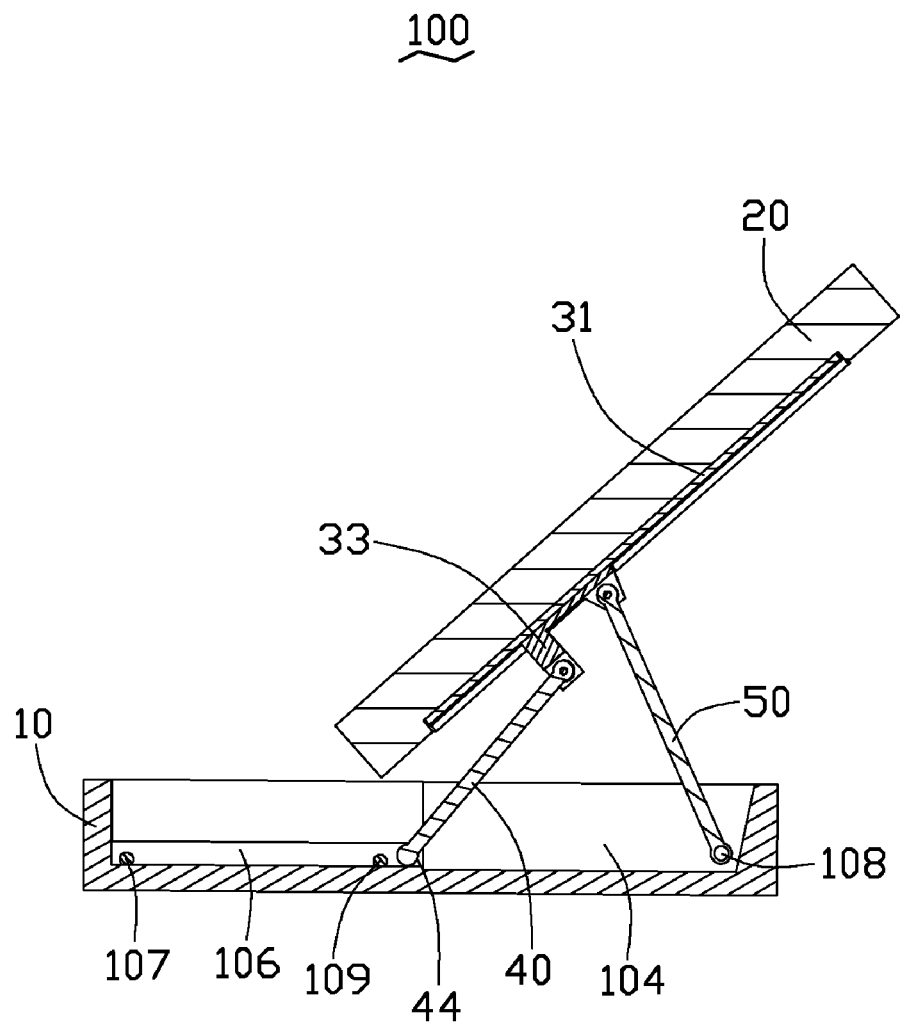
FIG. 8 is a cross-sectional view of the housing taken along line VIII-VIII of FIG. 6 in an open state.

Referring to FIG. 3, the first housing 10 defines a receiving chamber 104 for receiving the first hinge bar 40, and the second hinge bar 50. A sidewall of the receiving chamber 104 defines a sliding slot 106 along a longitudinal direction thereof. A positioning rod 108 is positioned on the sidewall of the receiving chamber 104 away from the sliding slot 106. The positioning rod 108 is configured for slidably connecting to the second hinge bar 50. A first protrusion 107 and a second protrusion 109 are positioned on two ends of the sliding slot 106, and are configured for latching the first hinge bar 40.

The second housing 20 includes a first surface 202, an opposite second surface 203, a first edge 205, and an opposite second edge 207. The first surface 202 includes a display screen 204 positioned thereon. The second housing 20 can be angularly tilted relative to the first housing 10 for better viewing of the display screen 204. A receiving slot 205 is defined in the second surface 203, and configured for receiving the tilt mechanism 30.

The tilt mechanism 30 includes a fixed plate 31, a sliding plate 33, and a resilient element 35. The fixed plate 31 includes two guides 312 bent from the two sides thereof. The sliding plate 33 includes a base 332, a first positioning portion 333, and a second positioning portion 334. Two ends of the base 332 are respectively bent into a guiding slot 336 for slidably matching with the guides 312. The first positioning portion 333 and the second positioning portion 334 are disposed at two ends of the base 332. The first positioning portion 333 defines a slit 3332 at a top portion thereof. A removable first post 60 spans the slit 3332 and is configured for rotatably connecting the first hinge bar 40 to the tilt mechanism 30. The second positioning portion 334 includes two opposite protruding plates 3342 and a removable second post 62 spanning between the protruding plates 3342. The second post 62 is configured for rotatably connecting the second hinge bar 50 to the tilt mechanism 30. The resilient element 35 may be a wire spring, a pressure spring, a torsion spring, or a spring plate. The resilient element 35 includes a first connecting end 352 and a second connecting end 354. Both the first connecting end 352 and the second connecting end 354 are ring shape. A hole 39 is respectively defined in the fixed plate 31 and the sliding plate 33. Two pins (not shown) are respectively inserted into the first connecting end 352, the second connecting end 354, a hole 39 defined in the fixed plate 31 and the sliding plate 33. Thus, the fixed plate 31 and the sliding plate 33 are connected by the resilient element 35, and a sliding distance of the fixed plate 31 relative to the sliding plate 33 can be limited by the resilient element 35.

An end of the first hinge bar 40 defines a through hole 42, the other end of the first hinge bar 40 includes a shaft 44 fixed thereon. The first post 60 can be inserted into the through hole 42. Thus, the first hinge bar 40 is respectively rotatably connected to the base 332. The shaft 44 can move in the sliding slot 106 and is latched to the first protrusion 107 and the second protrusion 109. Two free ends of the second hinge bar 50 respectively define a positioning hole 52. The second post 62 can be inserted into one of the positioning holes 52, the positioning rod 108 can be inserted into the other positioning hole 52. Thus, the second hinge bar 50 can rotate and support the second housing 20 from the closed state to the tilted state.

Referring to the FIGS. 4 to 7, in assembly, the fixed plate 31 is fixed in the receiving slot 205, thus the sliding plate 33 can slide relative to the second housing 20. The first post 60 is inserted into the through hole 42 of the first hinge bar 40, and two ends of the first post 60 are fixed to the slit 3332. The shaft 44 moves in the sliding slot 106. The second post 62 is inserted into one of the positioning holes 52 of the second hinge bar 50, and two ends of the second post 62 are fixed between the two protruding plates 3342. The positioning rod 108 is inserted into the other positioning hole 52. Thus, the first hinge bar 40 and the second hinge bar 50 can rotate and support the second housing 20 from the closed state to the tilted state. In the tilted state, the first edge 205 contacts the first housing 10, and the second edge 207 is tilted above the first housing 10. The first hinge bar 40 latches and resists the second protrusion 109.

When the electronic device 100 is to be closed, an external force is applied to the second housing 20 while the first housing 10 is kept stationary. The sliding plate 33 slides relative to the fixed plate 31 and maintains in closed state relative to the fixed plate 31. The second housing 20 presses the first hinge bar 40 to force the shaft 44 of the first hinge bar 40 to detach from the second protrusion 109, and move to the first protrusion 107. The end defining the through hole 42 of the first hinge bar 40 is rotated relative to the first positioning portion 333. Two ends of the second hinge bar 50 are respectively rotated relative to the second positioning portion 334 and the positioning rod 108. Meanwhile, the first hinge bar 40 and the second hinge bar 50 are gradually received in the receiving chamber 104. The first edge 205 slidably contacts the first housing 10, and the second edge 207 gradually comes closer to the first housing 10. When the first hinge bar 40 and the second hinge bar 50 are entirely received in the receiving chamber 104, the second housing 20 overlaps the first housing 10. The shaft 44 latches and resists the first protrusion 107. Thus, the second housing 20 is locked to the first housing 10.

When the electronic device 100 is to be opened, an external force is applied to the second housing 20 to move it away from the first housing 10, and the fixed plate 31 slides relative to the sliding plate 33. When the fixed plate 31 is fully open relative to the sliding plate 33, the second housing 20 is continually pushed by the external force. The first positioning portion 333 of the sliding plate 33 pulls the first hinge bar 40 to detach the shaft 44 from the first protrusion 107. The shaft 44 moves to the second protrusion 109. Meanwhile, the second hinge bar 50 is respectively rotated to the second positioning portion 334 and the positioning rod 108, and the first edge 205 slides on the first housing 10. The second edge 207 is tilted above the first housing 10 by the second hinge bar 50. When the shaft 44 is latched to the second protrusion 109, electronic device 100 is fully open.

It is noteworthy that the tilt mechanism 30 can be omitted. The first hinge bar 40 and the second hinge bar 50 can be directly connected to the second housing 20.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
a first housing;
a second housing;
a tilt mechanism attaching the first housing to the second housing;
a first hinge bar, a first end of the first hinge bar only rotatably connecting to the tilt mechanism, a second end of the first hinge bar rotatably and slidably connecting to the first housing; and
a second hinge bar, a first end of the second hinge bar only rotatably connecting to the tilt mechanism, a second end of the second hinge bar only rotatably connecting to the first housing;
wherein when the second housing slides relative to the first housing, the second hinge bar rotates relative to the first housing and the second housing, and supports and tilts the second housing.

2. The electronic device as claimed in claim 1, wherein the second end of the first hinge bar comprises a shaft fixed thereon, the shaft moves in the first housing.

3. The electronic device as claimed in claim 2, wherein the first housing defines a receiving chamber defining a sliding slot, the shaft is movably received in the sliding slot.

4. The electronic device as claimed in claim 3, wherein a first protrusion and a second protrusion are positioned at two ends of the sliding slot, the shaft is latched to the first protrusion or the second protrusion.

5. The electronic device as claimed in claim 3, wherein a positioning rod is positioned in the receiving chamber spaced from the sliding slot, the second hinge bar rotatably connects to the positioning rod.

6. The electronic device as claimed in claim 3, wherein the first hinge bar and the second hinge bar are rotatably received in the receiving chamber.

7. The electronic device as claimed in claim 1, wherein the tilt mechanism comprises a fixed plate, a sliding plate, and a resilient element connecting the fixed plate to the sliding plate; the fixed plate is positioned in the second housing, the sliding plate is slidable on the fixed plate; the sliding plate comprises a first positioning portion and a second positioning portion, the first end of the first hinge bar rotatably connects to the first positioning portion, the first end of the second hinge bar rotatably connects to the second positioning portion.

8. An electronic device comprising:
a first housing including a receiving chamber defining a sliding slot, a first protrusion and a second protrusion positioned at two ends of the sliding slot;
a second housing attached to the first housing;
a first hinge bar, a first end of the first hinge bar rotatably connecting to the second housing, a second end of the first hinge bar rotatably and slidably connecting to the first housing, the second end of the first hinge bar including a shaft fixed thereon, the shaft movably received in the sliding slot, the shaft latched to the first protrusion or the second protrusion; and
a second hinge bar, a first end of the second hinge bar rotatably connecting to the second housing, a second end of the second hinge bar rotatably connecting to the first housing;
wherein when the second housing slides relative to the first housing, the second hinge bar rotates relative to the first housing and the second housing, and supports and tilts the second housing.

9. The electronic device as claimed in claim 8, wherein a positioning rod is positioned in the receiving chamber spaced from the sliding slot, the second hinge bar rotatably connects to the positioning rod.

10. The electronic device as claimed in claim 8, wherein the first hinge bar and the second hinge bar are rotatably received in the receiving chamber.

11. An electronic device comprising:
a first housing;
a second housing attached to the first housing, the second housing comprising a first edge and a second edge opposite to the first edge;
a tilt mechanism comprising a fixed plate, a sliding plate, and a resilient element connecting the fixed plate to the sliding plate; the fixed plate positioned in the second housing, the sliding plate being slidable on the fixed plate; the sliding plate including a first positioning portion and a second positioning portion;
a first hinge bar, a first end of the first hinge bar rotatably connecting to the first positioning portion of the sliding plate, a second end of the first hinge bar rotatably and slidably connecting to the first housing; and a second hinge bar, a first end of the second hinge bar rotatably connecting to the second positioning portion of the sliding plate, a second end of the second hinge bar rotatably connecting to the first housing;

wherein when the second housing slides relative to the first housing, the first edge slides on the first housing, the first hinge bar and the second hinge bar rotate to tilt the second edge of the second housing away from the first housing.

12. The electronic device as claimed in claim 11, wherein the second end of the first hinge bar comprises a shaft fixed thereon, the shaft movably connects to the first housing.

13. The electronic device as claimed in claim 12, wherein the first housing defines a receiving chamber defining a sliding slot, the shaft is movably received in the sliding slot.

14. The electronic device as claimed in claim 13, wherein a first protrusion and a second protrusion are positioned at two ends of the sliding slot, when the second housing is in a closed position, the shaft is latched to the first protrusion; when the second housing is in a tilted position, the shaft is latched to the second protrusion.

15. The electronic device as claimed in claim 13, wherein a positioning rod is positioned in the receiving chamber spaced from the sliding slot, the second hinge bar rotatably connects to the positioning rod.

16. The electronic device as claimed in claim 13, wherein the first hinge bar and the second hinge bar are rotatably received in the receiving chamber.

* * * * *